(12) United States Patent
LaBruno et al.

(10) Patent No.: US 7,163,391 B2
(45) Date of Patent: Jan. 16, 2007

(54) MOLDING APPARATUS FOR FORMING FOOD PATTIES HAVING TOP AND BOTTOM SURFACE CONTOURS

(75) Inventors: Ronald F. LaBruno, Mokena, IL (US); Douglas Conerton, Mokena, IL (US)

(73) Assignee: Formax, Inc., Mokena, IL (US)

( * ) Notice: Subject to any disclaimer, the term of this patent is extended or adjusted under 35 U.S.C. 154(b) by 0 days.

(21) Appl. No.: 10/644,653

(22) Filed: Aug. 20, 2003

(65) Prior Publication Data

US 2005/0042321 A1    Feb. 24, 2005

(51) Int. Cl.
*B29C 45/40* (2006.01)

(52) U.S. Cl. .................. 425/572; 425/461; 425/574; 425/575

(58) Field of Classification Search ................ 425/461, 425/572, 574, 575
See application file for complete search history.

(56) References Cited

U.S. PATENT DOCUMENTS

4,054,967 A    10/1977  Sandberg et al.
RE30,096 E     9/1979   Richards
4,418,446 A    12/1983  Sandberg et al.
6,428,303 B1   8/2002   Lindee et al.

*Primary Examiner*—Tim Heitbrink
(74) *Attorney, Agent, or Firm*—The Law Office of Randall T. Erickson, P.C.

(57) ABSTRACT

A mold plate for a reciprocating mold plate food patty-forming apparatus has at least one laterally contoured region extending longitudinally. The contoured region has a raised top surface and a raised bottom surface. The mold plate has at least one cavity through the contoured region. A support plate has a recessed top surface extending longitudinally and corresponding in shape to the raised bottom surface of the mold plate and a fill opening in communication with the cavity when the mold plate is in the fill position during reciprocation of the mold plate. A breather plate has a recessed bottom surface extending longitudinally and corresponding in shape to the raised top surface of the mold plate. The top and bottom recessed surfaces of the support and breather plates respectively together form a longitudinal channel that closely conforms to the contoured region of the mold plate.

22 Claims, 6 Drawing Sheets

MOLDING APPARATUS FOR FORMING FOOD PATTIES HAVING TOP AND BOTTOM SURFACE CONTOURS

TECHNICAL FIELD OF THE INVENTION

The invention relates to a food patty-forming machine. Particularly, the invention relates to a reciprocating mold plate food patty-forming machine.

BACKGROUND OF THE INVENTION

Increasing use of pre-processed foods in homes and restaurants and other group eating establishments has created a demand for high-capacity automated food processing equipment. That demand is particularly evident with respect to hamburgers, molded steaks, fish cakes, and other molded food patties.

To increase consumer appeal it is known to provide a patty-molding or patty-forming machine with a mold plate having contoured cavities to form a two-dimensional horizontal profile patty that is curved or otherwise irregular to simulate the shape of a food item, such as a chicken drumstick. It is also known to provide a patty-molding or patty-forming machine with a mold plate with contoured cavities to form a two-dimensional horizontal profile patty, and an overlying breather plate with contoured areas, to provide a two-dimensional horizontal profile patty that also has a contoured top surface. However, in this arrangement, the bottom of the mold plate is flat to be flush against the flat fill plate or support plate provided on the mold patty forming machine. The corresponding molded patty has a flat bottom.

The present inventors have recognized the desirability of providing a patty-forming apparatus that is capable of molding three-dimensional food patties, each patty having an irregular or curved profile taken through a vertical cross-section and through a horizontal cross-section.

The present inventors have recognized the desirability of providing a patty-forming apparatus that is capable of molding food patties, each patty having both a top and a bottom non-flat surface contour.

The present inventors have recognized the desirability of providing tooling for retrofitting a food patty-forming machine, wherein the tooling can provide for the molding of three-dimensional food patties, each patty having an irregular or curved profile taken through a vertical cross-section and through a horizontal cross-section.

The present inventors have recognized the desirability of providing a tooling for retrofitting a patty-forming machine, wherein the tooling can provide for the molding of three-dimensional food patties, each patty having both a top irregular or curved contour and a bottom irregular or curved contour.

The present inventors have recognized the desirability of providing a patty-forming apparatus or tooling that is capable of molding food patties that more closely simulate the natural shape of a food item.

SUMMARY OF THE INVENTION

The invention provides a food patty-forming apparatus for forming shaped food patties, having non-flat top and bottom surfaces, from pressurized food product. The food patty formed by the apparatus or tooling of the invention more accurately simulates the natural three-dimensional shape of food items such as a chicken drumstick, by replacing the flat bottom of heretofore known formed products with a contoured bottom. The invention can produce a formed patty having contoured, non-flat surfaces on all sides of the patty.

The preferred embodiment of the invention includes a first plate, a second plate, and a mold plate. The first plate and second plate can be carried by a frame of a molding apparatus. The second plate is spaced from and facing the first plate. The mold plate is arranged to reciprocate longitudinally between the first and second plates between a fill position and a discharge position.

The mold plate of the preferred embodiment of the invention has at least one laterally contoured region extending longitudinally. The contoured region has a raised first surface and a raised second surface on an opposite side of the mold plate. The mold plate has at least one cavity through the contoured region. The first plate has a recessed first surface extending longitudinally and corresponding in shape to the raised second surface of the mold plate and a fill opening in communication with the cavity when the mold plate is in the fill position during reciprocation of the mold plate. When the mold plate is in the discharge position, the cavity is exposed outside the first plate for removal of the patty. The second plate has a recessed second surface extending longitudinally and corresponding in shape to the raised first surface of the mold plate. The first and second recessed surfaces of the first and second plates respectively together form a longitudinal channel that closely conforms to the contoured region of the mold plate.

In operation, a mechanism, operatively connected to the mold plate, reciprocates the mold plate between the fill position and the discharge position. A food product delivery system is configured to deliver pressurized food product into the fill opening. The delivery system typically includes a supply of food product, a food pump for pressurizing the food product, and a delivery channel into the fill opening.

According to the preferred embodiment, the second plate includes breather holes that are in communication with the cavity during filling of the cavity with food product, the breather holes also being in communication with non-pressurized atmosphere.

According to the preferred embodiment, the mold plate includes flat first surface areas extending longitudinally on opposite lateral sides of the raised first surface and flat second surface areas extending longitudinally on opposite lateral sides of the raised second surface. The first plate includes flat first plate surfaces extending longitudinally and flush with the flat first surface areas of the mold plate. The second plate includes flat second plate surfaces extending longitudinally and flush with the flat second surface areas of the mold plate.

According to the preferred embodiment, the cavity has a horizontal perimeter that includes curved lines.

According to the preferred embodiment, the cavity comprises a vertical profile having curved top and bottom surfaces.

According to the preferred embodiment, the cavity comprises a horizontal profile having curved sides.

According to the preferred embodiment, the cavity simulates the shape of a chicken drumstick.

According to the preferred embodiment, the first plate is arranged below the mold plate and the second plate is arranged above the mold plate.

According to another embodiment, the first plate is arranged above the mold plate and the second plate is arranged below the mold plate.

Numerous other advantages and features of the present invention will be become readily apparent from the following detailed description of the invention and the embodiments thereof, and from the accompanying drawings.

DETAILED DESCRIPTION OF THE PREFERRED EMBODIMENTS

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 1:
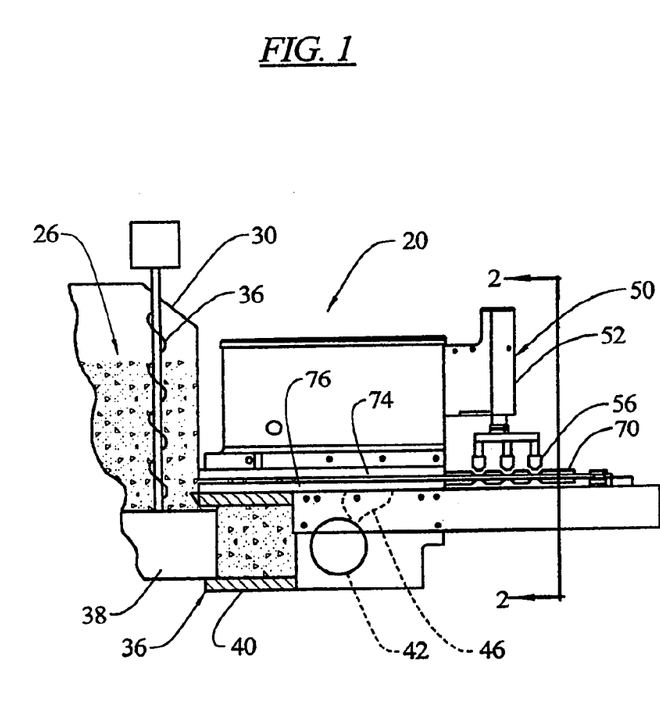
FIG. 1 is a fragmentary, diagrammatic elevational view of a patty-forming apparatus incorporating the present invention.

FIG. 1 illustrates a food patty-forming apparatus 20 incorporating the structure of the present invention. The food patty-forming apparatus 20 is generally configured substantially as shown and described in U.S. Pat. Nos. RE 30,096; 6,428,303; 4,418,446; and 4,054,967, all herein incorporated by reference. The food patty-forming apparatus can be generally configured as a FORMAX F-6, F-12, F-19, F-26 or an F400 reciprocating mold plate forming machine, available from Formax, Inc. of Mokena, Ill., U.S.A.

According to a typical patty-forming apparatus, a supply of food product 26 is contained within a hopper 30 and conveyed into a food pump 36 comprising a piston or plunger 38 that compresses the food product into a cylinder 40. The food product 26 is directed through a tube valve 42 which directs the pressurized food product through a fill channel 46. A reciprocating mold plate is located above the fill channel 46 when in a filling position and reciprocates to a discharge or knockout position such that the filled mold cavities are exposed wherein a knockout mechanism 50 removes the patties from the mold plate cavities. The knockout mechanism 50 includes a knockout drive 52 which vertically reciprocates knockout cups 56 which are sized slightly smaller than the cavities, and correspond in number and in shape to the cavities such that the downward traveling knockout cops remove the patties from the respective cavities. A breather plate is located above the mold plate. The breather plate provides breather holes to remove air from the cavities during filling.

FIGS. 1–4 illustrate the apparatus with a mold plate 70 in a knock out position. As it is understood from the aforementioned patents, the mold plate 70 is reciprocated horizontally from the knock out position rearward to a fill position above the fill channel 46. The pressurized meat product is filled from below into the cavities 96 of the mold plate. It is also encompassed by the invention, and known, that the fill channel 46 could be located above the mold plate. The mold plate 70 can be horizontally reciprocated by being engaged at its rear end portion such as shown in U.S. Pat. No. 6,428,303 or engaged at its front end portion by drive rods as shown and described in U.S. Pat. No. RE 30,096.

The meat product 26 within a hopper 30 can be conveyed along a bottom of the hopper such as described in U.S. Pat. No. RE 30,096, and/or conveyed by the use of motor driven screws 36 as described in U.S. Pat. Nos. RE 30,096, 4,054, 967, or 4,418,446.

The movements of the knockout cups 56 are synchronized for movement with the reciprocation of the mold plate 70.

The present invention provides an improved mold plate 70, an improved breather plate 74 and an improved fill adapter plate 76.

Figure 2:
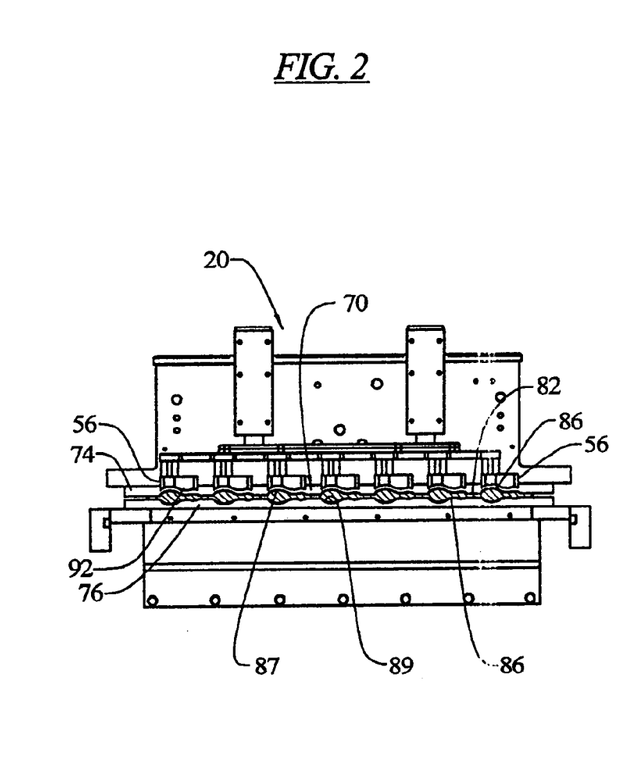
FIG. 2 is a sectional view taken generally along line 2—2 of FIG. 1.
Figure 6:
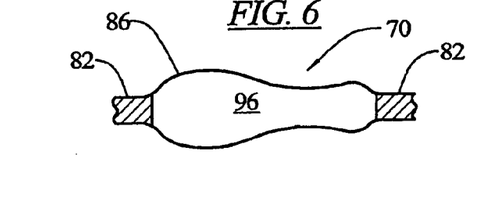
FIG. 6 is a fragmentary, enlarged sectional view taken generally along line 6—6 of FIG. 5.

As shown in FIGS. 2 and 6, the mold plate 70 has an irregular cross-section. The mold plate 70 includes alternating flat plate regions 82 and shaped regions 86. The shaped regions 86 extend longitudinally and are shaped to resemble a cross-section of an identifiable food product, such as a chicken drumstick. However, the invention is not limited to the shape, or even to the shape of an identifiable food item, and instead can be any shape which may have consumer appeal, such as a ball, an egg or a ribbed meat portion, and including decorative shapes or shapes of inedible items.

The shape could also be a shape for an animal, such as a dog bone shape.

Figure 8:
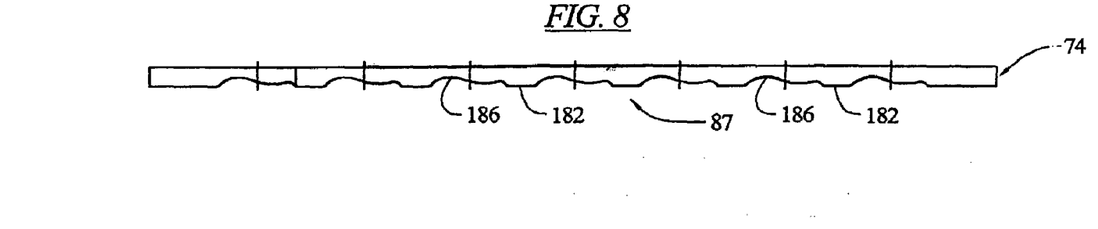
FIG. 8 is a front view taken generally along line 8—8 of FIG. 7.

As shown in FIGS. 2 and 8, the breather plate 74 includes a contoured bottom surface 87 that extends longitudinally and has a shape conforming closely to a top surface of the mold plate 70.

Figure 10:
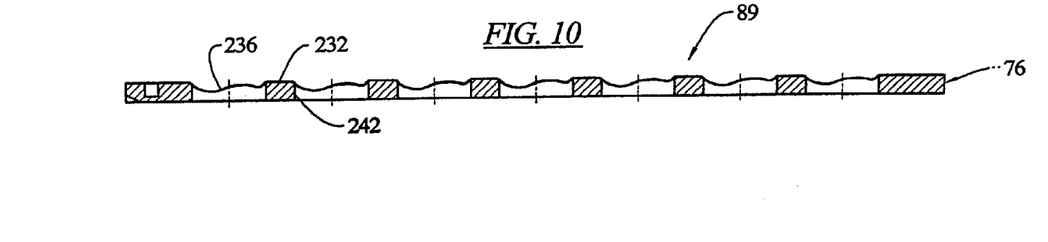
FIG. 10 is a sectional view taken generally along line 10—10 of FIG. 9.

As shown in FIGS. 2 and 10 the adapter plate 76 includes a contoured top surface 89 that extends longitudinally and has a shape that closely conform to the bottom surface of the mold plate 70.

The knockout cups 56 include a bottom surface 92 which conforms in shape to a top surface of the shaped region 86 of the mold plate 70.

Figure 3:
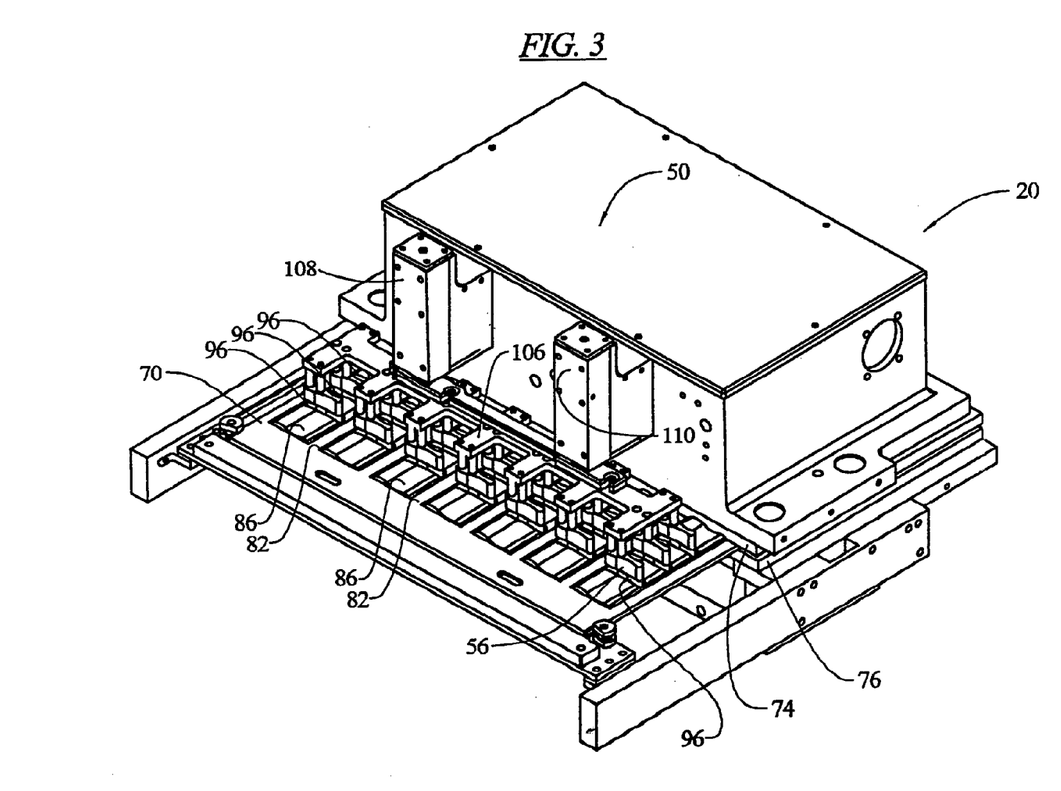
FIG. 3 is a fragmentary, enlarged top perspective view of the patty-forming apparatus of FIG. 1.
Figure 5:
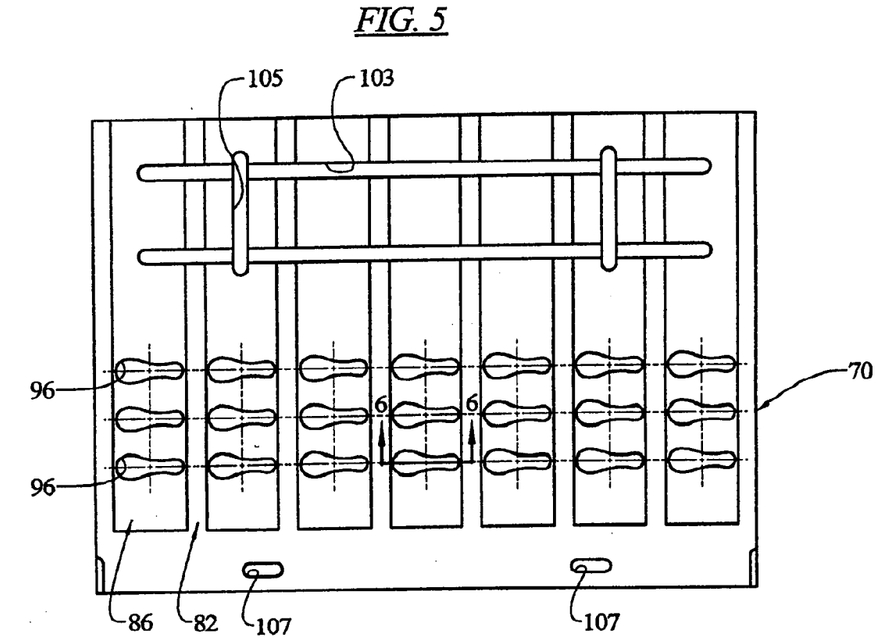
FIG. 5 is a plan view of a mold plate incorporated into the patty-forming apparatus of FIG. 1.

As shown in FIGS. 3 and 5, each shaped region 86 of the mold plate 70 includes three cavities 96 arranged spaced apart along a longitudinal direction of each shaped region 86. Although three rows of cavities 96 are shown, any number or rows are encompassed by the invention. The cavities can be in staggered rows or straight rows. The mold plate 70 further includes a double row of recesses 103 open to through-slots 105. The recesses 103 and slots 105 are used for lubricating the top surface of the plate 70 with product. At a front edge of the plate 70 are located drive keys 107 used for connecting the plate 70 to a drive mechanism.

The cavities 96 have an irregular or curved profile as viewed from above as shown more clearly in FIG. 5. The cavities are shaped in this horizontal profile to simulate the natural shape of a food item, such as a chicken drumstick, or other shape as described above. The knock out cups 56 have an identical, albeit slightly smaller, outside perimeter such that the knock out cups 56 can pass downwardly into the respective cavities 96 to remove the patty therein. The knock out cups 56 are mounted to a knockout assembly 106 that is raised and lowered by two knockout arms within housings 108, 110.

Figure 7:
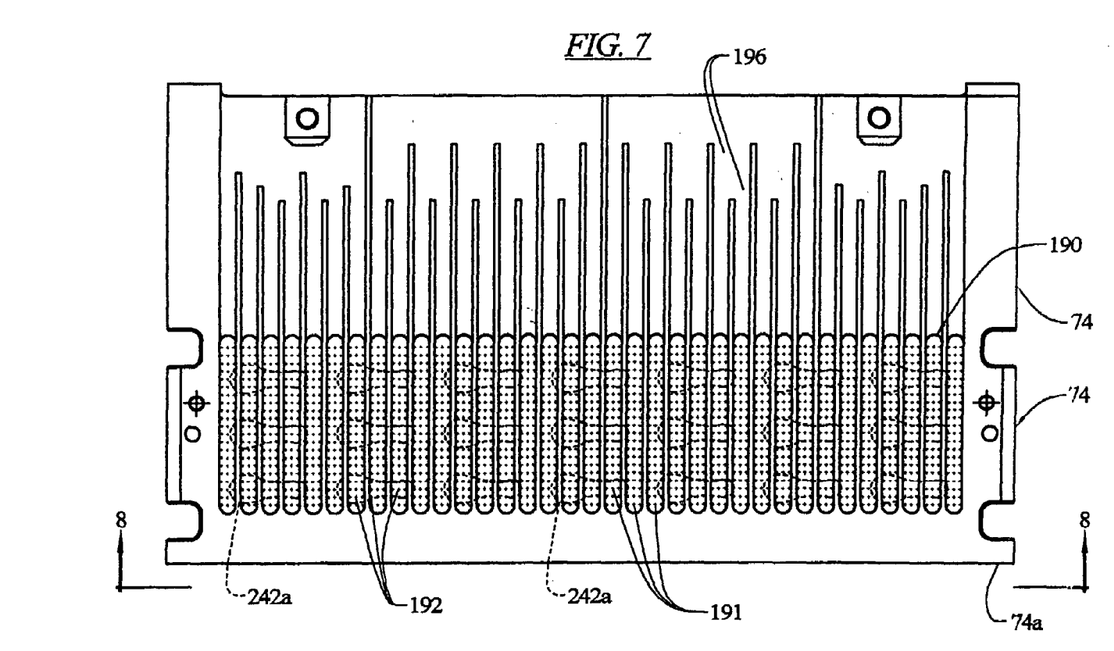
FIG. 7 is a plan view of a breather plate incorporated into the patty-forming apparatus of FIG. 1.

FIGS. 7 and 8 illustrate the breather plate 74 which overlies the mold plate partially in the knock out position of the mold plate and more substantially in the fill position of the mold plate. The breather plate includes the contoured bottom surface 87 having flat areas 182 that correspond in position to the flat plate regions 82 of the mold plate, and recessed areas 186 that correspond in shape to the shaped regions 86 of the mold plate. The breather plate 74 includes a dished region 190 that is provided with pre-partially-drilled potential breather hole locations 191. Preferably, the locations 191 that fall within the upwardly projected area of the fill ports, shown dashed as 242a, are drilled completely through to form breather holes 192. The breather holes 192 allow air and small meat fines to pass therethrough to allow the pressurized meat to enter the otherwise confined cavities 96 during filling of the cavities. Breather recesses or channels 196 are provided for returning the air and fines to the hopper 30 for pump 36. The contoured bottom surface 87 of the plate 74 extends from the breather region to a front edge of the plate 74.

Figure 9:
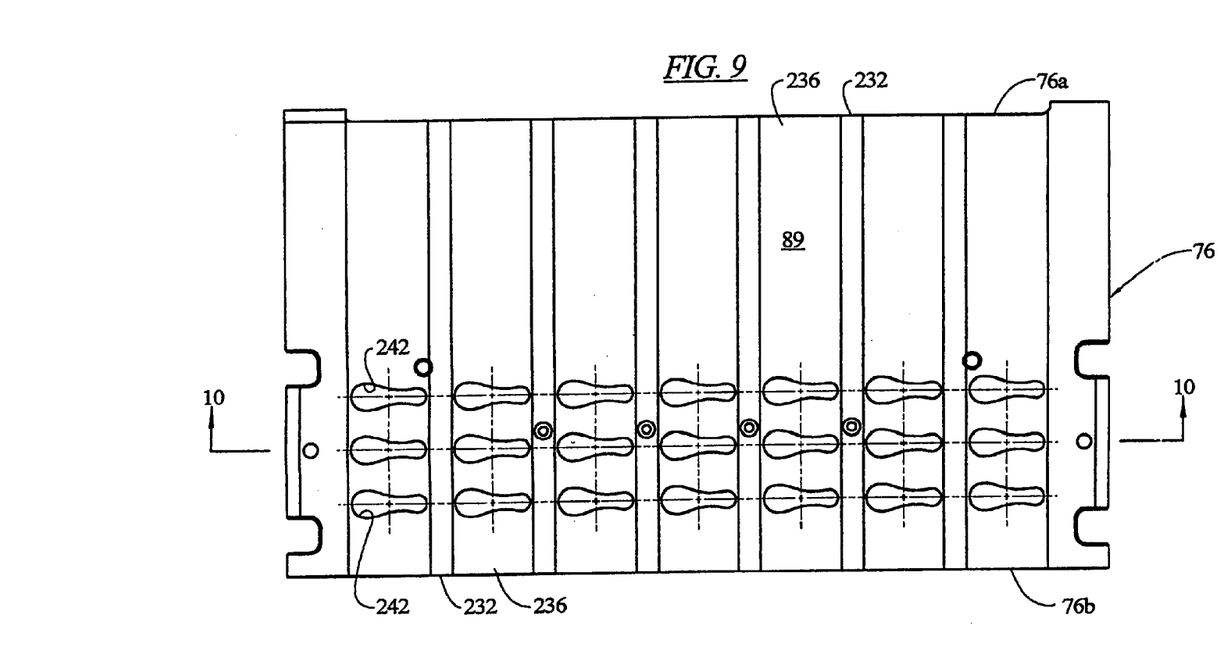
FIG. 9 is a plan view of an adapter plate incorporated into the patty-forming apparatus of FIG. 1.

FIGS. 9 and 10 illustrate the fill adapter plate 76. The fill adapter plate includes the continuous contoured top surface 89 from a back edge 76a to a front edge 76b. The contoured top surface 89 includes flat regions 232 and shaped regions 236 that correspond to the bottom contour of the flat plate regions 82 and shaped regions 86 of the mold plate 70, respectively. Within each shaped region 236 are located three fill ports 242 that correspond in number and shape to the cavities 96.

When the mold plate 70 is in the fill position, the fill ports 242 align with the cavities 96. Pressurized food component enters the fill ports 242 from the fill passage 46 and thereupon enter the cavities 96 during the fill stage of the movement of the reciprocating mold plate 70.

Figures 4, 11, 12:
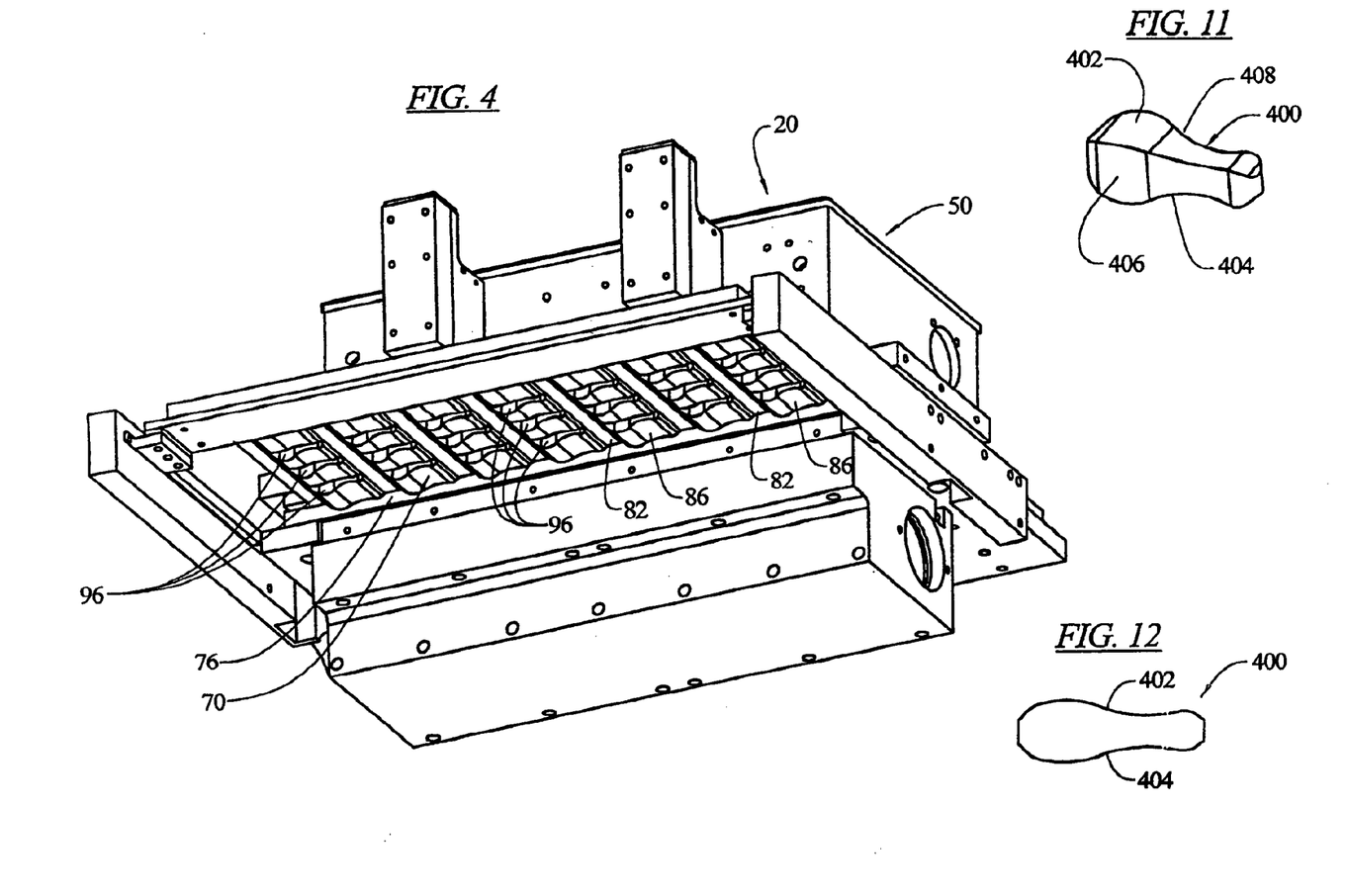
FIG. 4 is a fragmentary, enlarged bottom perspective view of the patty-forming apparatus of FIG. 1.
FIG. 11 is a perspective view of a patty formed by the patty-forming machine of FIG. 1.
FIG. 12 is an elevational view of the patty of FIG. 11.

FIG. 11 illustrates a completed patty 400 from the patty forming machine 20. The patty includes a contoured top surface 402, being curved in the horizontal as well as the vertical planes, a contoured bottom surface 404, also being contoured in the vertical and horizontal planes, and contoured side surfaces 406, 408, which are contoured in the horizontal plane.

FIG. 12 illustrates a vertical profile of the patty FIG. 11 showing the contoured surfaces 402 404, contoured in the vertical plane.

As demonstrated in FIGS. 11 and 12, the patty 400 simulates the natural or recognized shape of a chicken drumstick. The patty 400 does not have a flat bottom and is contoured in both vertical and horizontal profile.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A food patty-forming apparatus for forming food patties from pressurized food product, comprising:
   a frame;
   a first plate carried by said frame;
   a second plate carried by said frame, said second plate spaced from and facing said first plate;
   a mold plate guided to reciprocate longitudinally between said first and second plates between a fill position and a discharge position, said mold plate having a laterally contoured region extending longitudinally, said contoured region having a raised first surface and an oppositely facing raised second surface, directly aligned with said first raised surface through a thickness of said mold plate, said mold plate having a cavity through said contoured region, said first plate having a recessed first surface extending longitudinally and corresponding in shape to the raised second surface of said mold plate and a fill opening in communication with said cavity when said mold plate is in said fill position during reciprocation of said mold plate, and when said mold plate is in said discharge position, said cavity being exposed outside said first plate, said second plate having a recessed second surface extending longitudinally and corresponding in shape to the raised first surface of said mold plate, said first and second recessed surfaces of said first and second plates respectively each forming a channel that closely conforms around said first and second raised surfaces respectively of said contoured region of said mold plate;
   wherein said cavity has a horizontal perimeter that includes curved lines;
   wherein said cavity comprises a vertical profile having curved top and bottom sides;
   a mechanism operatively connected to said mold plate to reciprocate said mold plate between said fill position and said discharge position; and
   a food product delivery configured to deliver pressurized food product into said fill opening.

2. The apparatus according to claim 1, wherein said second plate includes breather holes that are in communication with said cavity during filling of said cavity with food product, said breather holes also being in communication with non-pressurized atmosphere.

3. The apparatus according to claim 1, wherein said mold plate includes flat first surface areas extending longitudinally on opposite lateral sides of said raised first surface and flat second surface areas extending longitudinally on opposite lateral sides of said raised second surface, and said first plate includes flat first plate surfaces extending longitudinally and flush with said flat first surface areas of said mold plate, and said second plate includes flat second plate surfaces extending longitudinally and flush with said flat second surface areas of said mold plate.

4. The apparatus according to claim 1, wherein said cavity comprises a horizontal profile having continuously curved sides.

5. The apparatus according to claim 4, wherein said cavity simulates the shape of a chicken drumstick.

6. The apparatus according to claim 1, wherein said first plate is arranged above said mold plate and said second plate is arranged below said mold plate.

7. The apparatus according to claim 1, wherein said first plate is arranged below said mold plate and said second plate is arranged above said mold plate.

8. Tooling for a food patty-forming apparatus for forming food patties from pressurized food product, the apparatus having food product delivery configured to deliver pressurized food product into a fill opening of said tooling, a mechanism operatively connected to said mold plate to reciprocate said mold plate between a fill position and a discharge position, the tooling comprising:
   a first plate;
   a second plate, said second plate spaced from and facing said first plate;
   a mold plate arranged to reciprocate longitudinally between said first and second plates between a fill position and a discharge position, said mold plate having a laterally contoured region extending longitudinally, said contoured region having a raised first surface and an oppositely facing raised second surface, directly aligned with said first raised surface through a thickness of said mold plate, said mold plate having a cavity through said contoured region, said first plate having a recessed first surface extending longitudinally and corresponding in shape to the raised second surface of said mold plate and a fill opening in communication with said cavity when said mold plate is in said fill position during reciprocation of said mold plate, and when said mold plate is in said discharge position, said cavity being exposed outside said first plate, said second plate having a recessed second surface extending longitudinally and corresponding in shape to the raised first surface of said mold plate, said first and second recessed surfaces of said first and second plates respectively each forming a channel that closely conforms around said first and second raised surfaces respectively of said contoured region of said mold plate;

wherein said cavity has a horizontal perimeter that includes curved lines; and wherein said cavity comprises a vertical profile having curved top and bottom sides.

9. The tooling according to claim 8, wherein said second plate includes breather holes through a thickness of said second plate that are in communication with said cavity during filling of said cavity with food product.

10. The tooling according to claim 8, wherein said mold plate includes flat first surface areas extending longitudinally on opposite lateral sides of said raised first surface and flat second surface areas extending longitudinally on opposite lateral sides of said raised second surface, and said first plate includes flat first plate surfaces extending longitudinally and flush with said flat first surface areas of said mold plate, and said second plate includes flat second plate surfaces extending longitudinally and flush with said flat second surface areas of said mold plate.

11. The tooling according to claim 8, wherein said cavity comprises a horizontal profile having continuously curved sides.

12. The tooling according to claim 11, wherein said cavity simulates the shape of a chicken drumstick.

13. The tooling according to claim 1, wherein said first plate is configured to be arranged above said mold plate and said second plate comprises a breather plate having breather holes.

14. The tooling according to claim 1, wherein said first plate is configured to be arranged below said mold plate and said second plate comprises a breather plate having breather holes.

15. The apparatus according to claim 1, wherein said cavity vertical profile is substantially identical in shape to said horizontal perimeter such that a molded article has a substantial rotational symmetricality about an axis thereof.

16. The tooling according to claim 8, wherein said cavity vertical profile is substantially identical in shape to said horizontal perimeter such that a molded article has a substantial rotational symmetricality about an axis thereof.

17. The apparatus according to claim 15, wherein said cavity simulates the shape of a chicken drumstick.

18. The tooling according to claim 16, wherein said cavity simulates the shape of a chicken drumstick.

19. Tooling for a food patty-forming apparatus for forming food patties from pressurized food product, the apparatus having food product delivery configured to deliver pressurized food product into a fill opening of said tooling, a mechanism operatively connected to said mold plate to reciprocate said mold plate between a fill position and a discharge position, the tooling comprising:

a first plate;

a second plate, said second plate spaced from and facing said first plate;

a mold plate arranged to reciprocate in a longitudinal direction between said first and second plates between a fill position and a discharge position, said mold plate having a laterally contoured region extending in said longitudinal direction, said contoured region having a raised first surface and an opposite, raised second surface, said mold plate having a cavity through said contoured region, said first plate having a recessed first surface extending in the longitudinal direction and corresponding in shape to the raised second surface of said mold plate and a fill opening in communication with said cavity when said mold plate is in said fill position during reciprocation of said mold plate, and when said mold plate is in said discharge position, said cavity being exposed outside said first plate, said second plate having a recessed second surface extending in the longitudinal direction and corresponding in shape to the raised first surface of said mold plate, said first and second recessed surfaces of said first and second plates respectively together forming a channel that closely conforms to said contoured region of said mold plate;

wherein said cavity has a horizontal perimeter that is defined by front and rear curved lines that are substantially mirror image identical across a vertical plane that extends in a lateral direction that is perpendicular to said longitudinal direction, and that bisects said horizontal perimeter;

wherein said cavity comprises a vertical profile in said vertical plane that is defined by continuously curved top and bottom lines that are substantially mirror image identical across a horizontal plane that bisects said vertical profile;

wherein said cavity vertical profile is substantially identical in shape to said horizontal perimeter such that a molded article has a substantial rotational symmetricality about an axis defined as the intersection of said lateral vertical axis and said horizontal plane.

20. The tooling according to claim 19, wherein said second plate includes breather holes through a thickness of said second plate that are in communication with said cavity during filling of said cavity with food product.

21. The tooling according to claim 20, wherein said mold plate includes flat first surface areas extending longitudinally on opposite lateral sides of said raised first surface and flat second surface areas extending longitudinally on opposite lateral sides of said raised second surface, and said first plate includes flat first plate surfaces extending longitudinally and flush with said flat first surface areas of said mold plate, and said second plate includes flat second plate surfaces extending longitudinally and flush with said flat second surface areas of said mold plate.

22. The tooling according to claim 19, wherein said cavity simulates the shape of a chicken drumstick.

* * * * *